US008863278B2

(12) United States Patent
Chitor et al.

(10) Patent No.: US 8,863,278 B2
(45) Date of Patent: Oct. 14, 2014

(54) GRID SECURITY INTRUSION DETECTION CONFIGURATION MECHANISM

(75) Inventors: Ramesh V. Chitor, Fremont, CA (US); Sebnem Jaji, Flower Mound, TX (US); Nam S. Keung, Austin, TX (US); Michel P. Riviere, Millbrae, CA (US); Christopher J. Strauss, Trabuco Canyon, CA (US)

(73) Assignee: International Business Machines Corporation, Armonk, NY (US)

( * ) Notice: Subject to any disclaimer, the term of this patent is extended or adjusted under 35 U.S.C. 154(b) by 1520 days.

(21) Appl. No.: 12/127,882

(22) Filed: May 28, 2008

(65) Prior Publication Data

US 2009/0300760 A1    Dec. 3, 2009

(51) Int. Cl.
| | |
|---|---|
| G06F 21/00 | (2013.01) |
| G06F 21/56 | (2013.01) |
| G06F 21/55 | (2013.01) |
| G06F 9/50 | (2006.01) |

(52) U.S. Cl.
CPC ............... *G06F 21/55* (2013.01); *G06F 21/56* (2013.01); *G06F 21/00* (2013.01); *G06F 9/5072* (2013.01)
USPC .............. 726/22; 709/223; 709/226; 370/389

(58) Field of Classification Search
CPC . G06F 9/5072; G06F 17/30283; G06F 21/00; G06F 15/16; G06F 15/173; G06F 17/30215; G06F 21/50; G06F 21/55; G06F 21/56; G06F 21/577; G06F 21/71; G06F 9/45533
USPC .......................................................... 726/22
See application file for complete search history.

(56) References Cited

U.S. PATENT DOCUMENTS

| | | | |
|---|---|---|---|
| 6,158,010 A * | 12/2000 | Moriconi et al. ................. 726/1 |
| 6,173,418 B1 | 1/2001 | Fujino et al. | |
| 6,289,379 B1 | 9/2001 | Urano et al. | |
| 7,155,514 B1 | 12/2006 | Milford | |
| 7,185,076 B1 | 2/2007 | Novaes et al. | |
| 7,421,500 B2 * | 9/2008 | Talwar et al. ................. 709/227 |
| 8,041,798 B1 * | 10/2011 | Pabla et al. ................... 709/223 |
| 2004/0254919 A1 | 12/2004 | Giuseppini | |
| 2006/0206940 A1 * | 9/2006 | Strauss et al. ................... 726/23 |
| 2008/0098113 A1 * | 4/2008 | Hansen et al. ................ 709/226 |

OTHER PUBLICATIONS

Matthew Smith et al. "Security Issues in On-Demand Grid and Cluster Computing." Sixth IEEE International Symposium on Cluster Computing and the Grid, 2006. CCGRID 06. vol. 2, pp. 14-24.*

* cited by examiner

*Primary Examiner* — Taghi Arani
*Assistant Examiner* — Narciso Victoria
(74) *Attorney, Agent, or Firm* — Lieberman & Brandsdorfer, LLC

(57) ABSTRACT

A method, apparatus, and article of manufacture are provided to support security in a distributed grid computer cluster. Each non-node root node in the cluster is configured with a local security agent, and the root node is configured with a security controller to manage each of the security agents of each non-root node. The security agent of each non-root node is in communication with an associated configuration file that contains data private to the respective non-root node, to allow the security agent to manage security local to the node. The security controller of the root node is in communication with a controller configuration file that contains data that applies to all security agents in the grid cluster, to allow the controller to manage the security agents.

11 Claims, 5 Drawing Sheets

Configuration Table Node$_N$

| | |
|---|---|
| 202 | Identifier |
| 204 | Executable Program to Start Service |
| 206 | Time$_{MAX}$ Start |
| 208 | Time$_{MAX}$ Shutdown |
| 210 | Lock |

Agent Environment Table

| | |
|---|---|
| 304 | Name of Program |
| 306 | Time$_{MAX}$ to Start |
| 308 | Time$_{MAX}$ to Shutdown |
| 310 | Program Startup Sequence |
| 312 | Program Shutdown Sequence |
| 314 | Security Service |
| 316 | Security Setting |

GRID SECURITY INTRUSION DETECTION CONFIGURATION MECHANISM

BACKGROUND OF THE INVENTION

1. Technical Field

This invention relates to a distributed computer system known as a grid cluster in which a cluster of loosely coupled computers function as a single computer. More specifically, the invention relates to management of configuration information for the grid cluster and security associated therewith.

2. Description of the Prior Art

A computer cluster is a group of loosely coupled computers, also known as nodes that work together closely so that in many respects they can be viewed as though they are a single computer. Clustering is used for parallel processing, load balancing, and fault tolerance. For example, clustering is a popular strategy for implementing parallel processing application because it enables leveraging of assets within the cluster. The components of a cluster are commonly, but not always, connected to each other through fast local area networks. Clusters are usually deployed to improve performance and/or availability over that provided by a single computer, while typically being much more cost-effective than single computers of comparable speed or availability. Examples of different types of computer clusters include high availability cluster and high performing computer clusters. The high availability cluster is deployed for the purpose of improving accessibility to an application through the use of redundant nodes, and the high performance computing cluster increases performance by splitting tasks across different nodes in the cluster. Regardless of the type of computer cluster, they all share the common characteristics of a cluster wherein the nodes are geographically located in a single computer center to support the leveraging of assets among the nodes.

Another form of computer networking that is closely related to cluster computing is grid computing, also known as grid clusters. The key differences between grid clusters and traditional clusters are that grid clusters connect collections of computers which do not fully trust each other, or which are geographically dispersed. Grid clusters typically support heterogeneous collections than are commonly supported in clusters. In one embodiment, a grid cluster may be composed of two or more computer clusters, wherein the grid connects the clusters. Accordingly, grid clusters resemble more of a computing utility than a single computer.

Grid computing optimizes workloads which consist of many independent jobs or packets of work, which do not have to share data between the jobs during the computation process. More specifically, grids serve to manage the allocation of jobs to computers which will perform the work independently of the rest of the grid cluster. Resources such as storage may be shared by all the nodes, but intermediate results of one job do not affect other jobs in progress on other nodes of the grid.

Given the structure of the grid computing system, security issues arise with respect to execution of code, system modification, etc. However, the grid computing system does not have the security features of a computer cluster. Accordingly, the inventors of this invention have identified a need for employment of a security system in a grid computing system which extends to protection of system and application modification, execution of malicious code, and other unauthorized use of the resources within the grid.

SUMMARY OF THE INVENTION

This invention comprises a method, apparatus, and article for security within a grid cluster.

In one aspect of the invention, a computer system is provided with a grid cluster having at least a root node in communication with a first non-root node through a network connection. A security agent is provided local to the non-root node to monitor security for the non-root node and to respond to a detected security violation of the non-root node. In addition, a security controller is provided local to the root node. The security controller monitors security for the non-root node through the security agents of both the root node and the non-root node.

In another aspect of the invention, a method is provided for managing security in a grid cluster. The grid cluster is configured with at least a root node in communication with a first non-root node through a network connection. Security of the non-root node is locally monitored through a local security agent. A detected security violation of the non-root node is responded to by the local security agent. Security of the non-root node is also monitored through a security controller local to the root node. The security controller employs both the security agent of the non-root node and a security agent local to the root node for monitoring security.

In yet another aspect of the invention, an article is provided with a computer-readable carrier including computer program instructions configured to manage security for a grid cluster. Instructions are provided to configure the grid cluster with at least a first root node in communication with a first non-root node through a network connection. In addition, instructions are provided to monitor security of the non-root node local to the non-root node through a local security agent. Instructions are also provided to monitor security of the non-root node local to the root node through a security controller local to the root node.

Other features and advantages of this invention will become apparent from the following detailed description of the embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

FIG. 2 is a block diagram of a sample configuration table.

FIG. 3 is a block diagram of a sample agent environment table.

DESCRIPTION OF THE PREFERRED EMBODIMENT

Figure 1:
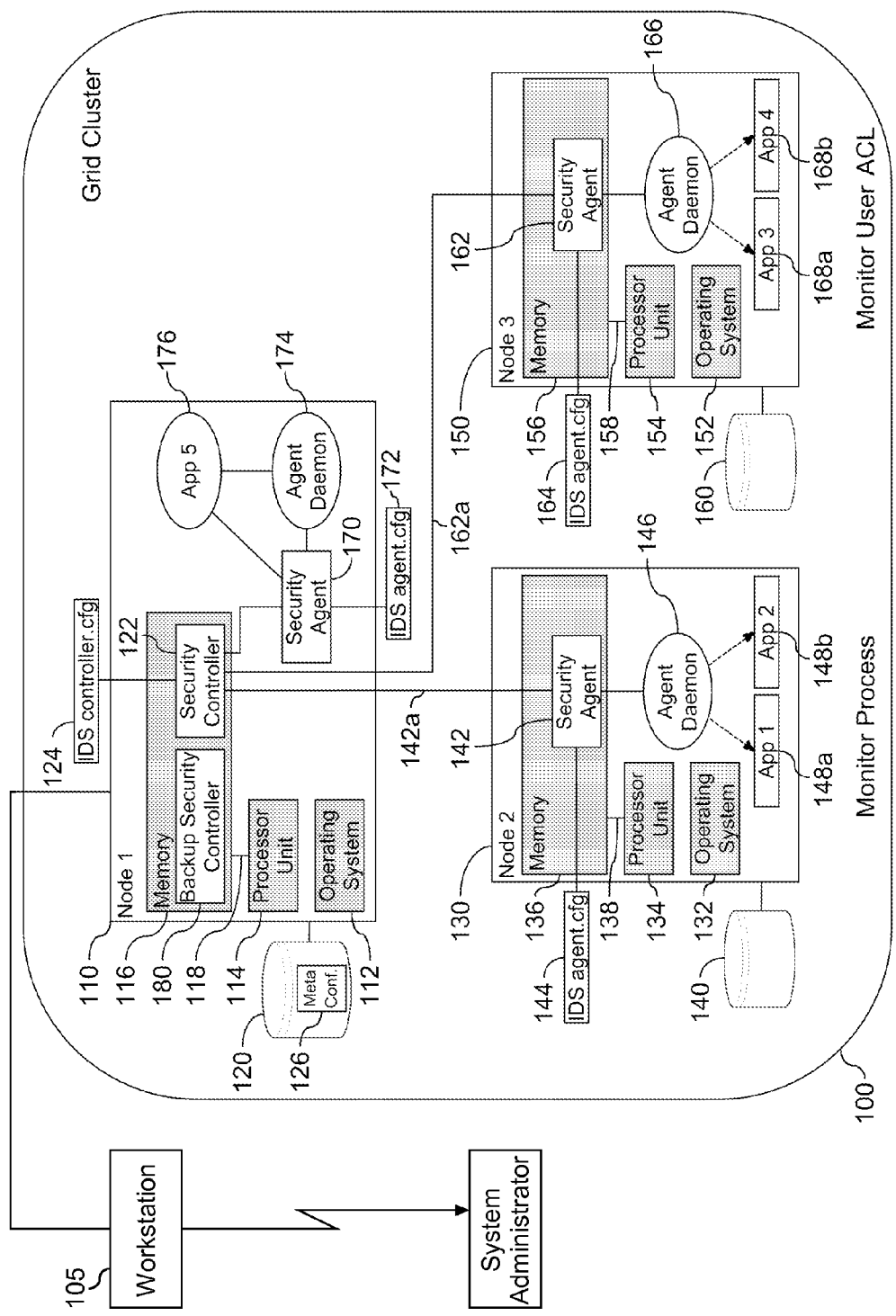
FIG. 1 is a block diagram of a grid cluster, according to the preferred embodiment of this invention, and is suggested for printing on the first page of the issued patent.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Many of the functional units described in this specification have been labeled as security agents. A security agent may be implemented in programmable hardware devices such as field programmable gate arrays, programmable array logic, programmable logic devices, or the like. Security agents may also be implemented in software for execution by various types of processors. An identified security agent of executable code may, for instance, comprise one or more physical or logical blocks of computer instructions which may, for instance, be organized as an object, procedure, function, or other construct. Nevertheless, the executables of an identified security agent need not be physically located together, but may comprise disparate instructions stored in different locations which, when joined logically together, comprise the security agent and achieve the stated purpose of the security agent.

Indeed, a security agent of executable code could be a single instruction, or many instructions, and may even be distributed over several different code segments, among different programs, and across several memory devices. Similarly, operational data may be identified and illustrated herein within a security agent, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment", "one embodiment", or "an embodiment" means that a particular feature, structure, or characteristic described in connection with the embodiment is included in at least one embodiment of the present invention. Thus, appearances of the phrases "a select embodiment", "in one embodiment", or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Overview

The method, apparatus, and article of manufacture of the present invention provides valuable advantage over the prior art. According to the present invention, security configuration for a distributed gird computer cluster can be distributed among each individual non-root node of the cluster, with a security controller local to the root node to manage each of the agents of each non-root node. Each security agent of each node manages security local to the node. In one embodiment, structured query language, SQL, may be employed to manage a configuration database associated with each node. Without the teachings of the present invention, the security settings for each node in the grid cluster would be set and monitored remotely.

Technical Details

In the following description of the embodiments, reference is made to the accompanying drawings that form a part hereof, and which is shown by way of illustration the specific embodiment in which the invention may be practiced. It is to be understood that other embodiments may be utilized because structural changes may be made without departing from the scope of the present invention.

FIG. 1 is a block diagram of a grid cluster (100). In this example, the grid cluster includes three nodes (110), (130), and (150), wherein the first node (110) is a root node, and nodes (130) and (150) are non-root nodes. Although only two non-root nodes are shown, the invention should not be limited to a grid with only two non-root nodes. In one embodiment, the grid cluster (100) may be limited to one non-root node (130), or to more than two non-root nodes. For purposes of description, the grid cluster (100) will be described with the three exemplary nodes (110), (130), and (150) shown herein. Both non-root nodes (130) and (150) are similarly configured with respect to the grid cluster (100). Non-root node (130) is provided with an operating system (132), a processor unit (134) coupled to memory (136) by a bus structure (138) and in communication with storage media (140). Similarly, non-root node (150) is provided with an operating system (152), a processor unit (154) coupled to memory (156) by a bus structure (158) and in communication with storage media (160). Storage media (140) contains a configuration database for non-root node (130), and storage media (160) contains a configuration database for non-root node (150). In one embodiment, each configuration database for each non-root node is different. As shown herein, each non-root node (130), (150) of the grid cluster (100) is a stand alone server or workstation that is in communication with a root node (110). Each non-root node (130), (150) is in communication with the root node (110) through a secure network connection. More specifically, the secure network connection is between the security controller (122) of node (110) and the security agent of a respective non-root node (130), (150). In one embodiment, a secure network connection may be in the form of SSL or another similar form of authentication. The purpose of the secure connection is to prevent unauthorized entry to the grid (100). The security controller (122) manages the security agent(s) (142), (162) of the non-root nodes (130) and (150), respectively. Management of the security agents includes, but is not limited to, verifying configuration across all security agents in the grid cluster. Accordingly, each node in the network has a secure connection to the grid.

With respect to the grid cluster elements, each non-root node (130) and (150) is provided with a security agent and an associated security agent configuration file. As shown herein, non-root node (130) is provided with a security agent (142) and an associated security agent configuration file (144). Similarly, non-root node (150) is provided with a security agent (162) and an associated security agent configuration file (164). In one embodiment, the security agents reside in memory local to the node. As shown, security agent (142) is residing in local memory (136), and security agent (162) is residing in local memory (156). The security agents (142) and (162) and their associated configuration files (144) and (164) form part of the intrusion detection system security configuration for the respective non-root nodes. In one embodiment, the security agent is a process in the form of an executable program. An initial employment of the security agent utilizes local storage. However, in one embodiment, once the security agent is executed, it can be stored in cache or local memory. Similarly, each non-root node is shown with an agent daemon in communication with the security agent and one or more applications. More specifically, non-root node (130) shows an agent daemon (146) in communication with the security agent (142) and with two applications (148a) and (148b), and non-root node (150) shows an agent daemon (166) in communication with the security agent (162) and two applications (168*a*) and (168*b*). The agent daemons (146) and (166) are elements that act for the associated security agent (142) and (162), respectively. In one embodiment, the agent daemons (146) and (166) are software elements. However, the invention should not be limited to this embodiment. For example, in one embodiment the agent daemons (146) and (166) may be embedded in firmware or hardware of the associated node. More specifically, each agent daemon (146) and (166) are processes that run in the background of the associated non-root node (130) and (150), respectively, and perform a specified operation at predefined times or in response to certain events. The action of the agent daemon implies the authority to decide which action, if any, on behalf of the respective security agent is appropriate.

Each security agent in each non-root node includes a security agent configuration file. As shown in FIG. 1, non-root node (130) has a security agent configuration file (144) and non-root node (150) has a security agent configuration file (164). Each security agent configuration file contains private data for its respective cluster grid node. All configuration data and associated configuration tables that apply to agents (142) and (162) reside in the respective file (144) and (164), respectively. As referenced above, the configuration file contains one or more configuration tables with configuration data therein. The security agent monitors security for the node. As shown, security agent (142) monitors security for non-root node (130), and security agent (162) monitors security for non-root node (150). In one embodiment, the root node (110) may be configured with its own security agent (170) to monitor security for the root node (110). At such time as a security violation is detected in a node, a security agent local to the detection node communicates the violation to the security controller (122). Examples of security violations include, but are not limited to, file access, user locking, violation for loading files, improper loading of application on a node, etc. In response to a detected security violation, the security controller (122) reviews security settings to determine a response to the security violation. In one embodiment, examples of a response include, but are not limited to, removing a non-root node affected by the security violation from the grid cluster, removing an affected processor from the grid cluster, etc. Accordingly, the configuration file functions together with the security agents to maintain the security of the grid cluster.

FIG. 2 is a block diagram (200) of a sample configuration table, also referred to herein as a component table. Each table contains information about a security agent for each respective node, i.e. root node and non-root nodes, within the grid cluster. Such information includes an identifier (202). In one embodiment, the identifier is an integer that represents one specific security agent. Other components contained within the table may include: the name of the executable program to start the service (204), the maximum time allowed for the service to start (206), the maximum time allowed for the service to shut down (208), and the name of the lock associated with the service (210). In one embodiment, the component table may identify more than one executable program with each separately referenced executable program in the table identified with its own executable name, maximum time allowed to start, maximum time allowed to shut down, and the name of an associated lock for the component. Accordingly, there is a separate configuration table for each security agent for each respective node in the cluster grid, with each table identifying one or more components within the grid cluster, with each component having its own separately referenced characteristics.

In addition to the configuration table for the separately identifiable components, the configuration file may contain at least one agent environment table therein. FIG. 3 is a block diagram (300) of a sample agent environment table. As shown, this table (300) references the executable programs from the components table of FIG. 2. More specifically, each environment table may reference the following: the name of the executable program for the associate service (304), the maximum time allowed for the executable program to start (306), the maximum time allowed for the executable program to shut down (308), and sequence of execution of the programs for startup (310), the sequence of execution of the programs for shutdown (312), the security service (314), and the security setting for the associated service (316). As referenced in the component table, each component has an associated setting with each setting reflecting an associated security level. In one embodiment, the settings include, high, medium, low, and advanced. For example, a high setting may provide an enhanced level of security for the component in comparison to a low setting for the same component. In addition to the security setting, each component may utilize different operating aspects within the individual node and or grid cluster. This is reflected in the service setting (316). Different components may utilize or affect different services within the node and/or grid, including application services, operating system services, network services, user group services, etc. The services utilized by the component are reflected in the agent environment table as reflected in FIG. 3. Each agent configuration file for each non-root node contains private data to a given cluster non-root node. All configuration data and configuration tables that apply to a single security agent for a non-root node reside in this configuration file local to the respective non-root node. In addition to the configuration file, the environment table includes a set of rules to manage control of a security violation. The rules dictate classes of violations and associated tools for remedying the violations. In one embodiment, there are two classes of violations. A first class addresses violations subject to the non-root node, and a second class addresses violations subject to the root node. The first class of violations is managed by a tool local to the non-root node that is subject to the security violation, and the second class of violations is managed by the security controller. In one embodiment, security violations include authentication errors, unauthorized access to files, ownership and privilege violations, file attribute violations, network violations, policy violations, etc. Accordingly, within each agent configuration table there is at least one agent environment table that stores security settings and associated services of the specified component.

As shown in FIGS. 2 and 3, each non-root node contains security settings for the respective node. In other words, the security settings for the components of the non-root node are local to the non-root node. The security agent for the respective non-root node monitors the security settings local to the node. A security agent for one non-root node cannot monitor the security settings local to another non-root node.

Referring back to FIG. 1, as shown in grid cluster (100) there is one root node (110) and two non-root nodes (130) and (150). In a similar manner to the non-root nodes, the root node includes an operating system (112), a processor unit (114) coupled to memory (116) by a bus structure (118), with the operating system (112) in communication with storage media (120). The local storage media (120) includes a meta configuration file (126). This file (126) contains the security controller files for the root node (110). In one embodiment, if the root node (110) includes a security agent (170), the security agent configuration files for the root node (110) is stored locally to the storage (120) in the meta configuration file (126). Similarly, the security agent configuration files for the non-root nodes (130) and (150) are also stored locally to the storage (120) in the meta configuration file (126). In one embodiment, the configuration database for the root node is different from the configuration database for each non-root node. The root node (110) for the cluster grid (100) includes a security controller (122) and an associated configuration file (124) for the controller (122). In one embodiment, the security controller (122) resides in local memory (116). The security controller (122) is unique to the root node (110) in that it manages all of the security agents (142) and (162) in the grid cluster (100) as shown by the associated connection (142a) and (162a) to each security agent, respectively. The security controller configuration file (124) contains data that is common for all security agents (142) and (162) in the grid cluster (100). All configuration data that applies to all non-root nodes, i.e. otherwise known as agents, (130) and (150) in the grid (100) reside in this file.

Accordingly, the root node (110) includes both a security agent configuration file and meta configuration file.

Figure 4:
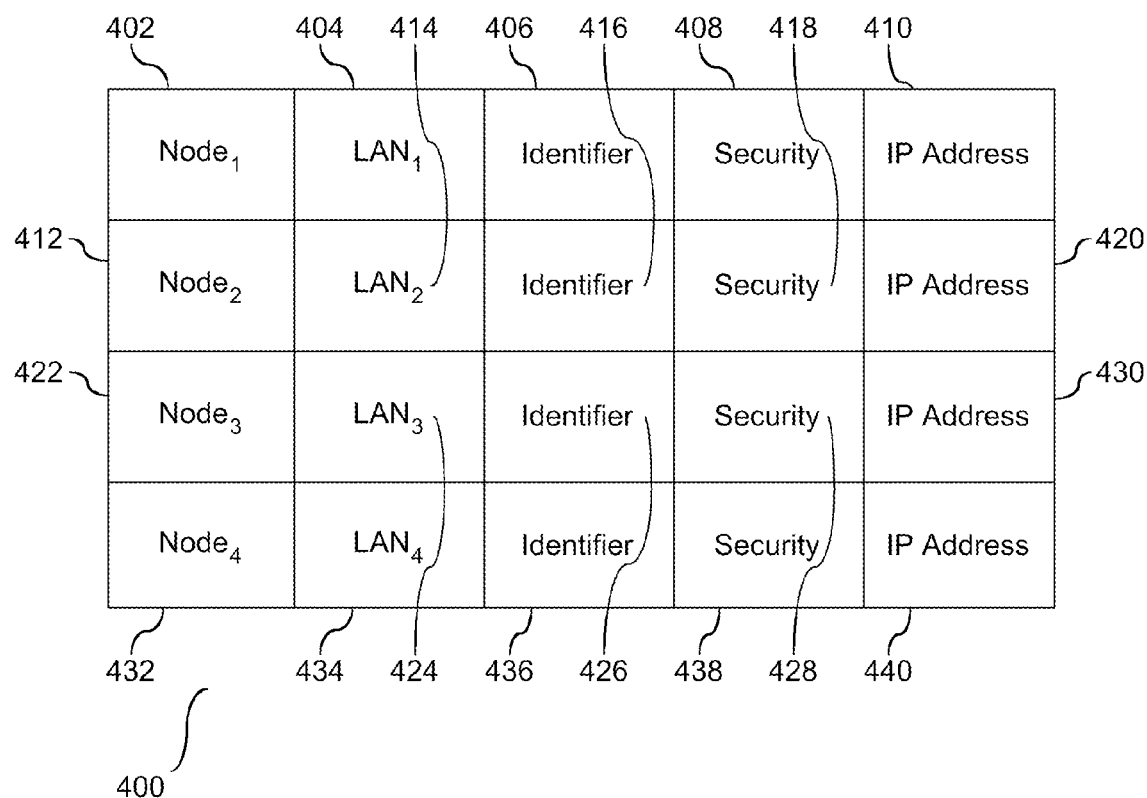
FIG. 4 is a block diagram of an example security controller configuration file.

FIG. 4 is a block diagram (400) of an example security controller configuration file, which in effect describes the topology of the grid cluster. As described above, the grid cluster may be a compilation of different networks that are enveloped into a single grid. For example, the first non-root node (130) may represent a first local area network, and the second non-root node (150) may represent a second local area network. In the example file diagram (400), each non-root node represents different local area networks, i.e. $LAN_1$ and $LAN_2$. In the security configuration file, two non-root nodes are identified as belonging to two different local area networks, with each network having two nodes therein. More specifically, the first non-root node (402) in the topology is identified in the first local area network, $LAN_1$ (404), with an identifier (406) for the first non-root node, security setting, i.e. priority, (408), and internet protocol address (410). The security configuration file proceeds to identify the remaining networks and nodes in the grid cluster (100) as follows: the second non-root node in the grid cluster is identified (412) in the second local area network, $LAN_2$ (414), with an identifier (416) for a second node, security setting, i.e. priority, (418), and internet protocol address (420). The third non-root node in the grid cluster is identified (422) in the first local area network, $LAN_1$ (424) with an identifier for the third node (426), security setting, i.e. priority, (428), and an internet protocol address (430). The fourth non-root node in the grid cluster is identified (432) in the second local area network, $LAN_2$ (434), with an identifier (436) for the third node, security setting, i.e. priority, (438), and an internet protocol address (440). Accordingly, the file described herein provides the topology of the architecture of the grid cluster identifying each non-root node in the cluster and the network within which the non-root node may be a member.

In addition to identifying the topology of the grid cluster, the security controller configuration file maintains data pertaining to the cluster grid that is common to all agents, i.e. non-root nodes security agents, in the cluster. Examples of such common data include agent quorum timeout, heartbeat interval, and start fibrillation count. The agent quorum timeout is a parameter within the security file that reflects formation of a cluster. For example, to form the grid cluster to support a specific service, a certain quantity of non-root nodes may be necessary so that the resources within the nodes can be leveraged for the services to be supported by the grid cluster formed. The agent quorum timeout parameter specifies how long a service on a given agent waits before deciding that a quorum has been achieved, and proceeds with an algorithm to form the grid cluster. In one embodiment, if the grid cluster is not performed within the definitions of this parameter, the security controller of the root node will not register formation of a grid cluster. This parameter is a cluster-wide value that applies to all agents, i.e. non-root nodes, in the grid cluster. In one embodiment, the value assigned to this parameter may vary depending on the number of security agents in the grid cluster. The heartbeat interval is a parameter that specifies the interval between heartbeat messages sent by the security controller of the root node to the non-root nodes in the cluster. In a characteristic of the security controller, the heartbeat interval is a cluster wide single value that applies to all security agents in the grid cluster. The third parameter, identified above as the start fibrillation count, specifies how many heartbeat messages are missed before the service declares that the communication path in question is not functioning properly. This parameter is a cluster-wide single value that applies to all security agents in the cluster grid.

Referring back to FIG. 1, in one embodiment, the root node (110) may also contain a security agent with an associated agent daemon in communication with one or more applications. As shown in FIG. 1, root node (110) is shown with a security agent (170), with an associated agent configuration file (172) local to the agent (170). In addition, the security agent (170) includes an agent daemon (174) in communication with an application (176). Further description of the functionality of the security agent (170) and associated daemon (174) is equivalent to that described in the non-root nodes, and will not be elaborated on herein. In one embodiment, the root node (110) may include a backup security controller (180) on local memory (116). The backup security controller (180) functions as a safety precaution in the event of failure or error associated with the security controller (122). More specifically, the backup security controller (180) manages a security agent of a non-root node in the event of failure of the security controller (122). Although the backup security controller (180) is shown local to the root node (110), it is not restricted to the root node (110). In one embodiment, the backup security controller (180) may reside on any one of the non-root nodes in the grid cluster. Accordingly, the backup security controller eliminates a single point of failure of the security controller (122).

The root node (110) is shown in communication with an external workstation (105). As shown in FIG. 1, the workstation (105) resides external to the grid cluster (100) and does not form part of the grid. Rather, the workstation severs as an interface to the grid (100). In one embodiment, the workstation (105) includes a communication tool, such as a browser, to interface with the grid cluster (100). For example, a system administrator may communicate with the grid cluster through an interface on the workstation (105). Through the workstation (105) interface, a system administrator may initialize all applications or system products. Accordingly, security of the grid may be monitored and managed through a client workstation in communication with the root-node (110).

As shown in detail in FIGS. 1-4, the grid cluster includes a root node with a security controller and an optional security agent, and one or more non-root nodes each with a respective security agent. Grid security services are managed by the security controller local to the root node, and by each of the security agents local to the non-root nodes. The grid security services support the storage of configuration and status information for the grid cluster. The security controller of the root node manages each non-root node security agent. The security agents are distributed among the non-root nodes in the cluster, with each non-root node having its own local security agent and associated configuration database and the root node having a security controller that manages the one or more security agents in the grid cluster. Security services, provided by the grid cluster security agents and security controller, provide support for databases that are at the scope of a process, wherein the database is shared among multiple processes on the same computer, or cluster, and/or the database is shared among multiple computers in the grid cluster.

When a database is opened, a handle which identifies the manner in which the database is operating is returned to a caller. Databases can be opened in one of four scopes, including process scope, snapshot scope, computer scope, and cluster scope. A database opened in process scope can only be accessed by the requesting process. In process scope, the database is locked and used exclusively by a single process. A database opened in snapshot scope can only be accessed in a read-only mode. A database opened in computer scope can be shared by multiple processes on the same computer. A database opened in cluster scope can be shared by multiple processes on different computers in a cluster. The cluster scope pertaining to the database accommodates grid security services. When an instance of a grid security service is started, it is initially in a standalone mode. In one embodiment, grid security services can be used either in a standalone mode on a computer that might be part of a grid cluster, i.e. cluster mode. When used in cluster mode, the security services can be accessed by any process running on any computer in the cluster. The grid security services are highly available in that they continue to operate when one or more agents, i.e. non-root nodes, in the cluster fail. When the failed agents re-join the cluster, the members of the cluster ensure that their versions of any database(s) are updated. Similarly, when the context of a database is closed from any of the above listed scopes, the content is closed and connectivity to the database is lost.

Figure 5:
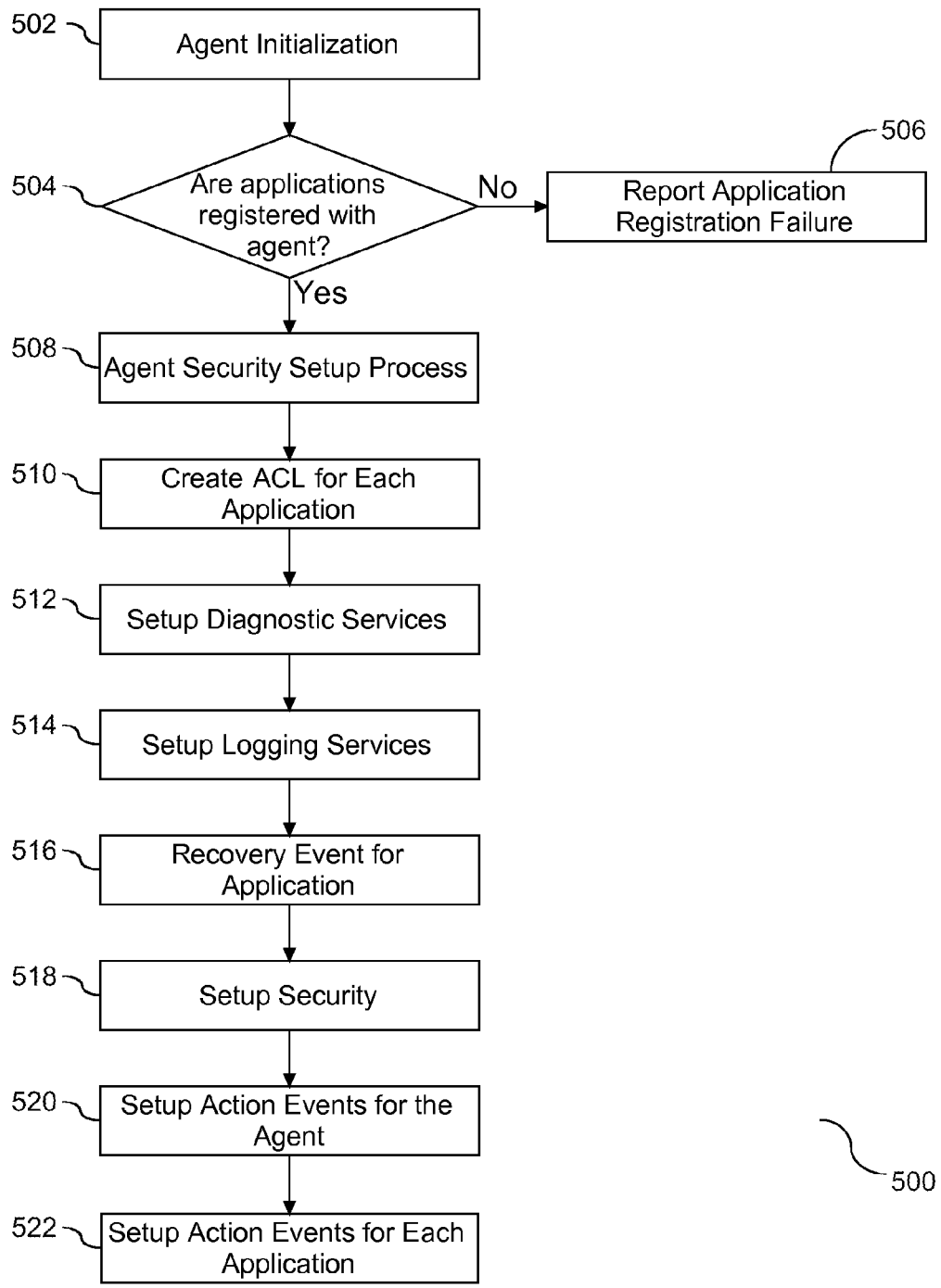
FIG. 5 is a flow chart illustrating the security process of the security agent of a non-root node.

FIG. 5 is a flow chart (500) illustrating the roles and responsibilities of each security agent for each non-root node in the grid cluster, and in the event there is a security agent local to the root node, to the security controller of the root node. As noted above, each security agent is initialized local to its non-root node (502). Following the security agent initialization, it is determine if each of the applications local to the respective non-root node registered with the respective security agent (504). A negative response to the determination at step (504) will result in reporting an application registration failure to the respective security agent (506). Accordingly, the first part in configuring the security agents is to have each local application registered with the respective agent.

Following registration of the application(s), several processes are initialized with the local security agent to support local security services (508). Each of the processes is outlined below. In computer security, an access control list (ACL) is a list of permissions attached to an object. This list specifies who or what is allowed to access the object and what operations are allowed to be performed on the object. The security agent creates an ACL entry for each registered application local to the respective node (510). In one embodiment, the ACL allows an administrator to have full access to each of the applications. The use of the ACL protects the application from unauthorized system modifications. After the ACL is created, the security agent sets up diagnostic services (512) for evaluation of registered applications local to the node. In one embodiment, the diagnostic services include, but are not limited to, determining the status of agent services, querying application status, obtaining application information, and monitoring applications. Following completion of the set of diagnostic services at step (512), the security agent sets up logging services for all registered applications local to the node (514). The logging services facilitate communication between the each of the registered applications and the respective security agent of the node. In one embodiment, the logging services indicates each security application event, when and where the event occurred, and the severity of the event. Part of the logging services include an intrusion monitor for one or more application records, which are logged in an agent audit journal log file. In one embodiment, each log entry consists of header information and message text. Similarly, in one embodiment, log records are written to log files on persistent storage to enable them to remain available after a system shutdown. Accordingly, steps (510)-(514) outline the set-up of security services between each registered application and the respective security agent.

It is known in the art that a registered application may suffer from a failure of some sort during execution. In the event of a failure, the registered application may need to be restarted. Similarly, if a registered application suffers a failure but is not shut down, it may need to be shut-down for servicing. Such application related events are managed by an event recovery tool in communication with the respective agent or each registered application (516). Aspects of event recovery include, but are not limited to, start-up of an application, restart of an application, shut-down of an application.

As noted, each node has a security agent that monitors security of each registered application local to the node. A part of the security agent set up process includes establishing a security level for each registered application local to the node (518) for the respective node. In one embodiment, there are different security levels that may be set for the registered application. The security level establishes a monitoring protocol by the agent. The higher the security level of the application, the greater the monitoring thereof. In addition to setting up the security level of the registered application, step (518) also includes establishing the security level of the respective security agent. In one embodiment, the security agent security level is established by the operating system. The higher the security level the greater the level of trust between the security controller and the agent. For example, the greater the security level of the agent, the greater the autonomy of the agent over the respective applications.

In addition to establishing security level set up of the respective agents, actions are established to response to application events and security events. Security agent action events (520) include, but are not limited to, registered application services, operating system services, network services, user and group services, and authorization to change a security agent setting. Registered application services (522) include, but are not limited to, filesystem authorization, process services, and authorization to change a security setting and/or services of a registered application. Accordingly, as shown, each security agent manager security of applications local to the node in which the security agent resides.

As shown in FIG. 5 there is a plurality of aspects to setting up security for the agent and registered applications thereof. In one embodiment the set-up process may follow the order illustrated herein. However, the invention should not be limited to the specific order of setting up the different security aspects. In one embodiment, the order may be changed to facilitate the needs of specific agents and/or applications in the grid cluster.

Figure 6:
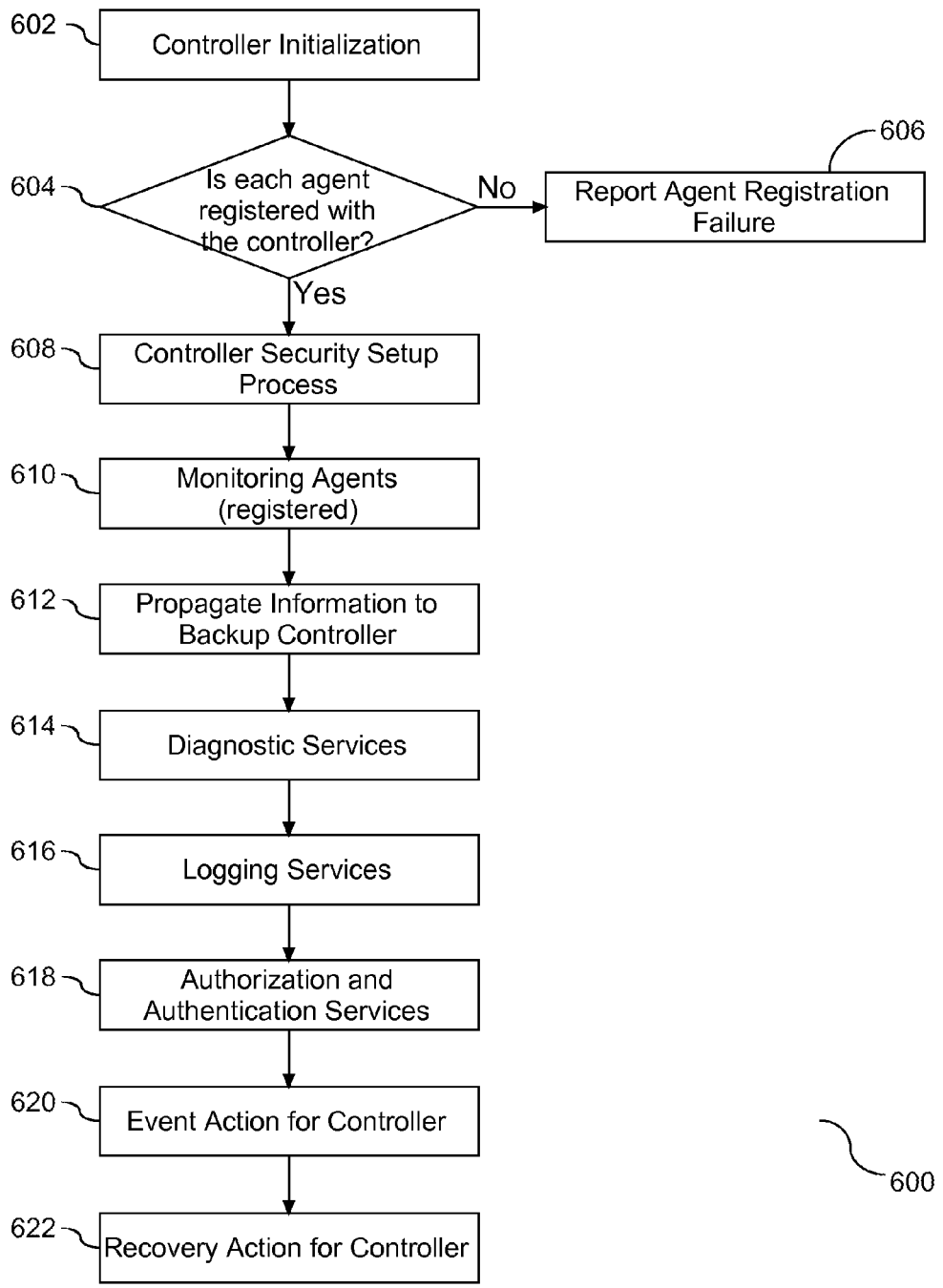
FIG. 6 is a flow chart illustrating the security process of the security controller of the root node.

In reference to the security controller, security services are managed via the root node to each of the non-root nodes in the grid cluster via the respective security agents of the non-root nodes. FIG. 6 is a flow chart (600) illustrating the registration of the security agents with the security controller of the root node. Initially, the root node security controller is initialized (602). Each security agent local to the non-root nodes in the grid cluster must register with the security controller. Following the initialization, it is determined if each security agent residing on the respective non-root nodes of the grid cluster have registered with the security controller (604). For each respective security agent that has not registered, a registration failure is reported to the security controller (606). Once all of the respective security agents have completed registration with the security controller, the controller security process is started (608). Based upon the security agent registration process, the security controller may start monitoring all of the non-root nodes in the grid cluster (610), for each non-root node that has a registered agent, and providing security services over the grid cluster.

Following registration of the security agent(s) and monitoring thereof (610), several processes are initialized with the security controller to support gird security services. The controller security processes are outlined below. For each registered security agent, the controller may access all non-root nodes and monitor the local security agents (610). As shown in FIG. 1, the root node may include a backup security controller in addition to the security controller. In an embodiment configured with a backup security controller, the security controller may propagate information to the backup security controller (612). As the controller for the distributed security agents, the controller can set up diagnostic services (614), including but not limited to, determining the status of controller services, querying the status of security agents, obtaining security agent information, etc. Following set-up of diagnostic services, the security controller initiates logging services of the grid cluster (616). Logging services indicates each registered security agent event, the location and time of the event, and the severity of the event. In one embodiment, log records are written to log files on persistent storage so they remain available after system shutdown or outage(s). Following initiating of logging service, authorization and authentication of an administrator or user to the grid security controller is established (618). With respect to the security of the grid cluster, the authorization, authentication, and network security services of the security controller are established. These services are employed to combat attacks into the grid cluster, including detecting unauthorized connections to the grid cluster.

Following set-up of the controller security processes at steps (610)-(618), the controller security process establishes action event for the controller (620), which includes actions and control over the registered security agents in the grid cluster. In one embodiment, such event actions include, but are not limited to start-up of a security agent, shut down of a security agent, and allowing a security agent to rejoin the grid cluster. The set-up at step (620) establishes protocols for recovery actions of the controller in the event of a failure of the controller. In addition to action event for the controller at step (620), the controller security process include a recovery action for the controller (622), including addressing elements associated with failure of the security controller. In one embodiment, a backup security controller is provided in the grid cluster, either local to the root node or local to one of the non-root nodes. Accordingly, as shown, the security controller manages the security of the grid cluster and the security agents within the grid cluster.

As shown in FIG. 6 there is a plurality of aspects to setting up security for the controller and registered agents of the non-root nodes, and or the root node. In one embodiment the set-up process may follow the order illustrated herein. However, the invention should not be limited to the specific order of setting up the different security aspects. In one embodiment, the order may be changed to facilitate the needs of the controller and specific agents in the grid cluster.

The embodiments shown herein pertain to components of a grid cluster and associated security agents local to non-root nodes, and a security controller local to a root node in the grid cluster. Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include but are not limited to a semiconductor or solid state memory, magnetic tape, a removable computer diskette, random access memory (RAM), read-only memory (ROM), a rigid magnetic disk, and an optical disk. Without limitation, current examples of optical disks include compact disk B read only (CD-ROM), compact disk B read/write (CD-R/W) and DVD.

A data processing system suitable for storing and/or executing program code includes at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Security services in the grid cluster are both local and global in the grid cluster. Local security services are provided by the security agent local to each non-root node in the cluster. Security settings for each non-root node are local to the non-root node and are managed by the local security agent. Each security agent is an executable program that runs on the local non-root node. Similarly, the root node includes a security controller local to the root node. The security controller monitors the security settings of each security agent on each non-root node. Accordingly, security for the grid cluster is distributed among the nodes of the cluster and is managed on the local level by the security agents local to the non-root node(s), and on a global level by the security controller local to the root node and in communication with the individual security agents of the non-root nodes in the grid cluster.

Alternative Embodiments

It will be appreciated that, although specific embodiments of the invention have been described herein for purposes of illustration, various modifications may be made without departing from the spirit and scope of the invention. In particular, each of the configuration databases for the security services of the individual nodes in the grid cluster contain data that can be manipulated through structured query language (SQL) interfaces. Accordingly, the scope of protection of this invention is limited only by the following claims and their equivalents.

We claim:

1. A computer system, comprising:
a grid cluster comprising hardware devices in the form of at least a root computer node in communication with a non-root computer node through a network connection;
a security agent local to the non-root node to monitor security for the non-root node and to respond to a detected security violation of the non-root node, wherein monitoring security for the non-root node by the security agent includes controlling access to resources associated with the non-root node;
a security controller local to the root node to monitor security for the non-root node through the security agent of the non-root node and a second security agent local to the root node, wherein the security agent of the non-root node communicates the detected security violation to the security controller, the security controller to determine a response to the security violation including removal of the non-root node from the grid cluster;
a component table local to the non-root node, the component table to identify an application and at least one characteristic of the application within the non-root node;
an agent environment table local to the non-root node, the agent environment table to reference all executable programs for all applications registered in the component table, with each application having a security level setting and identified services; and
a set of rules in said environment table to manage control of a security violation, the rules to dictate a first class of violations for management by a tool local to the non-root node subject to the violation and a second class of violations for management by the security controller.

2. The system of claim 1, further comprising the security controller to verify configuration across all security agents in the grid cluster.

3. The system of claim 1, further comprising a backup security controller to manage the security agent of the non-root node in the event of failure of the security controller.

4. The system of claim 1, further comprising a security controller configuration file in communication with the root node, the file to provide topology of the grid cluster and to identify each non-root node in the cluster.

5. A method for managing security in a grid cluster, comprising:
configuring the grid cluster with at least a root node in communication with a non-root node through a network connection;
monitoring security of the non-root node local to the non-root node through a local security agent, including responding to a detected security violation of the non-root node, wherein the security agent controls access to resources associated with the non-root node;
monitoring security for the non-root node through a security controller of the root node and through the security agent of the non-root node and a second security agent local to the root node, wherein the security agent of the non-root node communicates the detected security violation to the security controller, the security controller determining a response to the security violation including removing the non-root node from the grid cluster;
configuring a component table local to the non-root node for identifying an application and at least one characteristic of the application within the non-root node;
providing an agent environment table local to the non-root node, the table referencing all executable programs for all application registered in the component table, with each application having a security level setting and identified services; and
managing control of a security violation through a set of rules in said environment table, including dictating a first class of violations for management by a tool local to the non-root node subject to the violation and a second class of violations for management by the security controller.

6. The method of claim 5, further comprising managing said security agent of the non-root node by the security controller local to the root node, including verifying configuration across all security agents in the grid cluster.

7. The method of claim 5, further comprising managing the security agent of the non-root node in the event of failure of the security controller through a backup controller.

8. An article comprising:
a computer-readable device including computer program instructions configured to manage security for a grid cluster, the instructions comprising:
instructions to configure the grid cluster with at least a root node in communication with a first non-root node through a network connection;
instructions to monitor security of the non-root node local to the non-root node through a local security agent, including responding to a detected security violation local to the non-root node, wherein the security agent controls access to resources associated with the non-root node;
instructions to monitor security of the non-root node local to the root node through a security controller local to the root node, wherein the security agent of the non-root node communicates the detected security violations to the security controller, the security controller determining a response to the security violation including removing the non-root node from the grid cluster;
instructions to configure a component table local to the non-root node, the component table to identify an application and at least one characteristic of the application within the non-root node;
instructions to provide an agent environment table local to the non-root node, the table referencing all executable programs for all applications registered in the component table, with each component having a security level setting and identified services; and
instructions in the environment table to manage control of a security violation, the instructions dictating a first class of violations for management by a tool local to the non-root node subject to the violation, and a second class of violations for management by the security controller.

9. The article of claim 8, further comprising instructions local to the root node to verify configuration across all security agents in the grid cluster.

10. The article of claim 8, further comprising instructions to support the security controller with a backup controller to manage the security agent of the non-root node in the event of failure of the security controller.

11. The article of claim 8, further comprising a security configuration file local to the root node, the security configuration file to provide topology of the grid cluster and to identify each non-root node in the grid cluster.

* * * * *